(12) United States Patent
Sankarasubramanian et al.

(10) Patent No.: US 10,592,359 B2
(45) Date of Patent: Mar. 17, 2020

(54) SYSTEM AND A METHOD FOR PROVIDING ON-DEMAND RESILIENCY SERVICES

(71) Applicant: Cognizant Technology Solutions India Pvt. Ltd., Chennai (IN)

(72) Inventors: Senthil Ramaswamy Sankarasubramanian, Chennai (IN); Deepak Panneerselvam, Pudukkottai (IN); Karthik Kumar, Thuckalay (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 122 days.

(21) Appl. No.: 15/869,612

(22) Filed: Jan. 12, 2018

(65) Prior Publication Data
US 2019/0129813 A1    May 2, 2019

(30) Foreign Application Priority Data
Nov. 2, 2017    (IN) .............................. 201741039118

(51) Int. Cl.
*G06F 11/20* (2006.01)
*G06F 11/07* (2006.01)
(Continued)

(52) U.S. Cl.
CPC ...... *G06F 11/2025* (2013.01); *G06F 11/0709* (2013.01); *G06F 11/0757* (2013.01);
(Continued)

(58) Field of Classification Search
CPC .. G06F 2201/85; G06F 11/20; G06F 11/2025; G06F 11/2023; G06F 11/202;
(Continued)

(56) References Cited

U.S. PATENT DOCUMENTS 6,205,565 B1    3/2001    Bissett
9,208,007 B2    12/2015   Harper
(Continued)

OTHER PUBLICATIONS

Cathy Hawes and Chris Reed, "Theoretical Steps Towards Modeling Resilience in Complex Systems", Computational Science and Its Applications—ICCSA 2006. ICCSA 2006. Lecture Notes in Computer Science, vol. 3980. Springer, Berlin, Heidelberg (p. 7-9).
(Continued)

*Primary Examiner* — Joseph O Schell
(74) *Attorney, Agent, or Firm* — Cantor Colburn LLP

(57) ABSTRACT

A system and method for handling one or more dependency services hosted by one or more dependency servers for an upstream service hosted by an administrative server in a distributed computer architecture is provided. The present invention provides for identifying any abnormality in the behavior of the dependency services on the basis of metric values associated with service-parameters of said dependency services. Further, the resiliency services are enabled in order to handle one or more faltering dependency services based on the faulty metric values associated with the service-parameters. Yet further, the one or more faltering dependency services are continuously monitored, and one or more resiliency services are withdrawn once the fault in said dependency services is resolved. Yet further, the present invention provides a conversational bot interface for managing the administrative server and associated dependency services.

11 Claims, 4 Drawing Sheets

(51) Int. Cl.
*G06F 11/34* (2006.01)
*G06F 11/30* (2006.01)

(52) U.S. Cl.
CPC ...... *G06F 11/3006* (2013.01); *G06F 11/3452* (2013.01); *G06F 11/2023* (2013.01); *G06F 11/2033* (2013.01); *G06F 2201/85* (2013.01)

(58) Field of Classification Search
CPC ............. G06F 11/2033; G06F 11/2035; G06F 11/3006; G06F 11/0757
See application file for complete search history.

(56) References Cited

U.S. PATENT DOCUMENTS

| | | | | |
|---|---|---|---|---|
| 9,274,903 | B1* | 3/2016 | Garlapati | G06F 11/2002 |
| 9,455,992 | B2 | 9/2016 | Doucer | |
| 9,535,804 | B2 | 1/2017 | Kaplan | |
| 9,575,854 | B1 | 2/2017 | Liu | |
| 2011/0022882 | A1* | 1/2011 | Jaehde | G06F 11/2023 |
| | | | | 714/4.1 |
| 2011/0282507 | A1* | 11/2011 | Oudalov | H04B 3/54 |
| | | | | 700/292 |
| 2013/0159762 | A1* | 6/2013 | Chiu | G06F 11/2033 |
| | | | | 714/4.11 |
| 2013/0185667 | A1* | 7/2013 | Harper | G06F 11/0709 |
| | | | | 715/772 |
| 2014/0013125 | A1* | 1/2014 | Lynar | G06F 1/30 |
| | | | | 713/300 |
| 2014/0337674 | A1 | 11/2014 | Ivancic | |
| 2015/0301882 | A1* | 10/2015 | Liao | G05B 19/4184 |
| | | | | 714/47.3 |
| 2016/0048433 | A1* | 2/2016 | Andre | G06F 11/2033 |
| | | | | 714/4.1 |
| 2016/0092322 | A1* | 3/2016 | Nosov | G06F 11/2007 |
| | | | | 714/4.11 |
| 2016/0280401 | A1* | 9/2016 | Driscoll | B64G 3/00 |
| 2016/0371134 | A1 | 12/2016 | Raghavendra | |
| 2018/0157563 | A1* | 6/2018 | Bryant | G06F 11/203 |

OTHER PUBLICATIONS

Charles Jolley, "AI, Assistants, and Bots Demystified", Medium.com, 2016.

Jianxi Gao, Xueming Liu, Daqing Li and Shlomo Havlin, "Recent Progress on the Resilience of Complex Networks", Energies, 8, issue 10, 2015, pp. 1-24 (p. 2-6).

Kathleen McGill* and Stephen Taylor, "Application Resilience with Process Failures", International Conference on Security and Management, Special Track on Mission Assurance and Critical Infrastructure Protection, 2011 (p. 2).

Mike Wasson, Christopher Bennage and Alex Buck, "Designing resilient applications for Azure", Microsoft Azure, 2017 (p. 7, 9).

Netflix/Hystrix, "Resilience", 2016.

Nikolai Matni, et al., "Resilience in Large Scale Distributed Systems", Procedia Computer Science, vol. 28, 2014, pp. 285-293 (p. 3).

* cited by examiner

SYSTEM AND A METHOD FOR PROVIDING ON-DEMAND RESILIENCY SERVICES

FIELD OF THE INVENTION

The present invention relates generally to the field of failure management of services in a distributed computer architecture. More particularly, the present invention relates to a system and a method to effectively provide on-demand resiliency services in a distributed computer architecture.

BACKGROUND OF THE INVENTION

In the existing era, it has become common for information and software applications to be stored and run as services on cloud platforms. Communication service is one example in which this is becoming common, examples of communication services may include instant messaging, presence, collaborative applications, voice over IP (VoIP), and other types of unified communication applications. As a result of the growing reliance on cloud computing, it is a requirement for these services to maintain a high availability to customers. Satisfying this requirement is a complex problem due to the distributed nature of cloud-based applications and the non-trivial inter-dependencies of the service's components on each other.

The cloud computing architectures that are used to provide cloud services should therefore be resilient, i.e., provide reliable failover systems to ensure that users are not affected by outages that affect servers hosting applications or information for users. Further, said cloud computing architectures must be able to handle failure on a number of levels. For example, if a single server hosting IM or conference services fails, the architecture should be able to provide a failover for the failed server. As another example, if an entire data center with a large number of servers hosting different services fails, the architecture should also be able to provide adequate failover for the entire data center.

Further, some of the existing approaches for providing resiliency to the distributed system architecture include creating manual fault models using circuit breaker and fallback techniques. However, this technique has several drawbacks. Creating accurate fault models takes time and becomes prohibitively expensive if the functionality, architecture, and/or dependencies change often. Further, many factors affect functioning of a complex, distributed system, therefore manually created fault models are likely to miss many combinations of such factors. Human error and a lack of knowledge of all the dependencies for each component is likely to result in critical failures having high customer impact from being included in the fault models.

In light of the above drawbacks, there is a need for a system and a method which effectively detects and handles failure of one or more services hosted by one or more servers in a distributed computer architecture. There is a need for a system and a method which uses a proactive approach for monitoring any abnormality in the behavior of dependency services and automatically provide resiliency services, taking into consideration statistics of dependency services. Further, there is a need for a system and a method which can be easily integrated with any of the existing services. Yet further, there is a need for a system and a method which can be easily deployed and maintained without incurring high expenses.

SUMMARY OF THE INVENTION

A method for handling one or more dependency services hosted by one or more dependency servers for an upstream service hosted by an administrative server in a distributed computer architecture is provided. In various embodiments of the present invention, the method is performed by a service handling engine interfacing with one or more dependency servers and the administrative server. The service handling engine executes instructions stored in a memory via a processor. The method comprises analyzing, by the service handling engine, metric values associated with one or more predetermined service-parameters of one or more dependency services based on a first set of rules. The first set of rules comprises comparing the retrieved metric values with threshold metric values associated with the predetermined service-parameters to determine one or more faltering dependency services. The method further comprises enabling, by the service handling engine, resiliency services based on faulty metric values associated with one or more predetermined service-parameters of the one or more faltering dependency services. The enablement of a resiliency service comprises evaluation of parameters for circuit breaker of the resiliency service and selection of fallback technique of the resiliency service based on the faulty metric values associated with predetermined service-parameters. Further, the method comprises determining, by the service handling engine, if one or more faltering dependency services have recovered, where the one or more faltering dependency services are monitored and time duration for recovery is determined. Finally, the method comprises disabling, by the service handling engine, one or more resiliency services if one or more faltering dependency services have recovered, where disabling the resiliency service comprises closing the circuit breaker.

A system for handling one or more dependency services hosted by one or more dependency servers for an upstream service hosted by an administrative server in a distributed computer architecture is provided. In various embodiments of the present invention, the system interfaces with one or more dependency servers and the administrative server. The system comprises a memory storing program instructions; a processor configured to execute program instructions stored in the memory; and a service handling engine in communication with the processor. The service handling engine configured to analyze metric values associated with one or more predetermined service-parameters of one or more dependency services based on a first set of rules. The first set of rules comprises comparing the retrieved metric values with threshold metric values associated with the predetermined service-parameters to determine one or more faltering dependency services. Further, the service handling engine enables resiliency services based on faulty metric values associated with one or more predetermined service-parameters of the one or more faltering dependency services. The enablement of a resiliency service comprises evaluation of parameters for circuit breaker of the resiliency service and selection of fallback technique of the resiliency service based on the faulty metric values associated with predetermined service-parameters. Furthermore, the service handling engine determines if one or more faltering dependency services have recovered, where one or more faltering dependency services are monitored for recovery and time duration for recovery is determined. Finally, the service handling engine disables one or more resiliency services if one or more faltering dependency services have recovered, where disabling the resiliency service comprises closing the circuit breaker.

A computer program product is provided. The computer program product comprises a non-transitory computer-readable medium having computer-readable program code stored thereon, the computer-readable program code comprising instructions that, when executed by a processor, cause the processor to analyze metric values associated with one or more predetermined service-parameters of one or more dependency services based on a first set of rules. The first set of rules comprises comparing the retrieved metric values with threshold metric values associated with the predetermined service-parameters to determine one or more faltering dependency services. Further, resiliency services are enabled based on faulty metric values associated with one or more predetermined service-parameters of the one or more faltering dependency services. The enablement of a resiliency service comprises evaluation of parameters for circuit breaker of the resiliency service and selection of fallback technique of the resiliency service based on the faulty metric values associated with predetermined service-parameters. Furthermore, it is determined if one or more faltering dependency services have recovered, which further includes monitoring one or more faltering dependency services for recovery and determining time duration for recovery. Finally, one or more resiliency services are disabled if one or more faltering dependency services have recovered, wherein disabling the resiliency service comprises closing the circuit breaker.

BRIEF DESCRIPTION OF THE ACCOMPANYING DRAWINGS

The present invention is described by way of embodiments illustrated in the accompanying drawings wherein.

Figure 3:
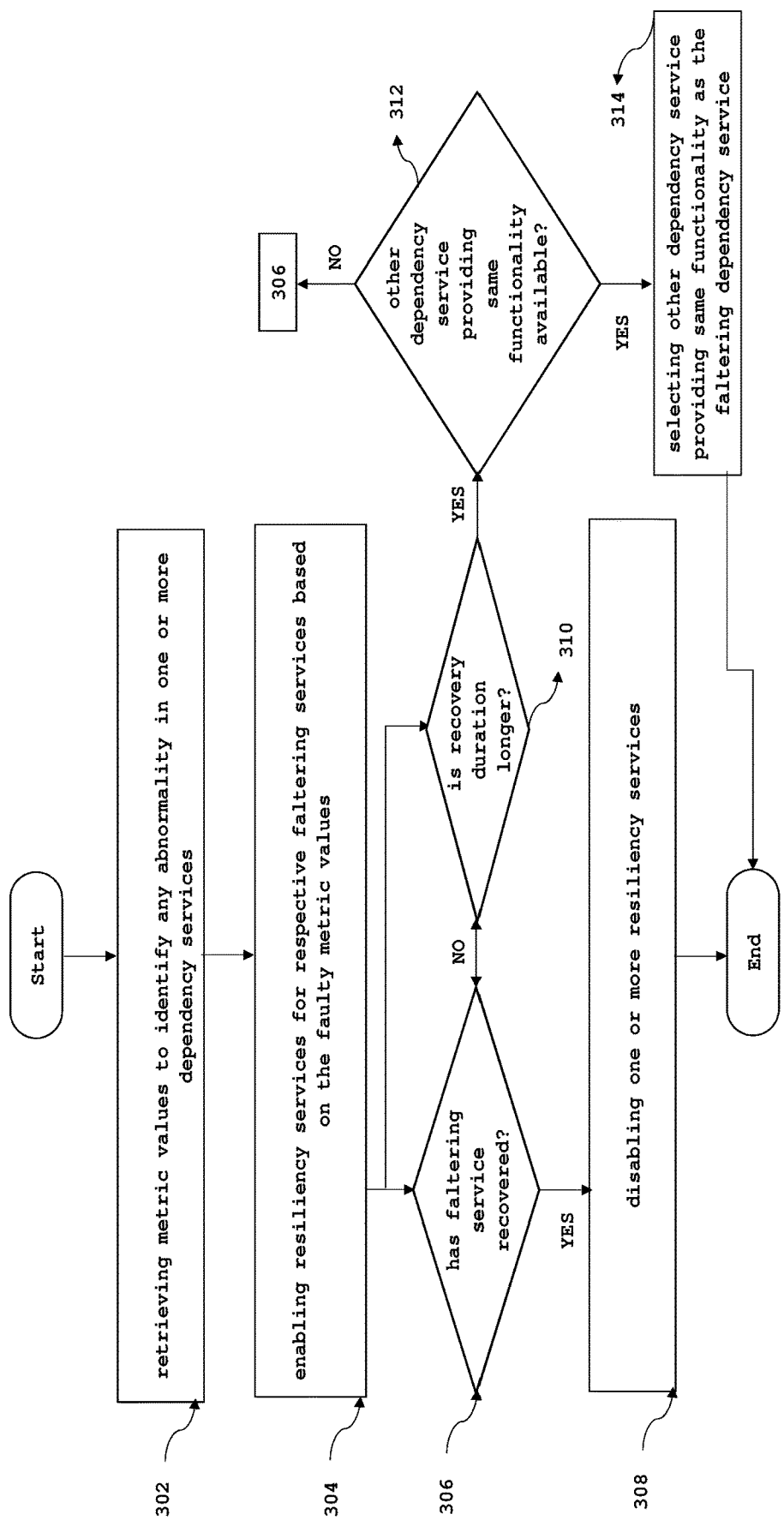
Figure 4:
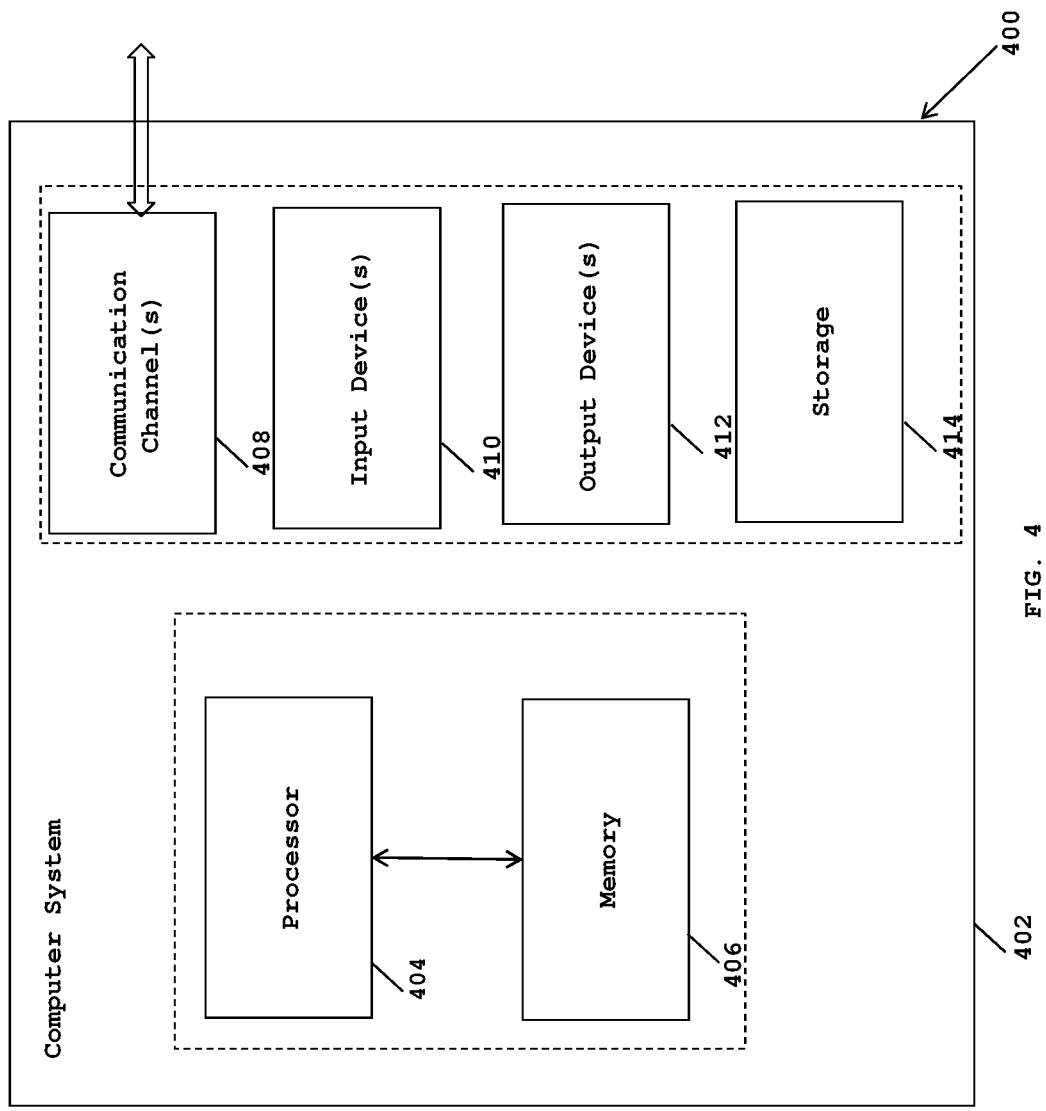

FIG. 3 is a flowchart illustrating a method for handling one or more dependency services hosted by one or more dependency servers for an upstream service hosted by an administrative server in a distributed computer architecture, in accordance with various embodiments of the present invention; and FIG. 4 illustrates an exemplary computer system in which various embodiments of the present invention may be implemented.

DETAILED DESCRIPTION OF THE INVENTION

The present invention discloses a system and a method for handling one or more dependency services hosted by one or more dependency servers for an upstream service hosted by an administrative server in a distributed computer architecture. The system and method of the present invention monitors and analyses statistics of one or more dependency services. In particular, the present invention provides for identifying any abnormality in the behavior of the dependency services on the basis of metric values associated with service-parameters of said dependency services. Thereafter, the invention provides for enabling resiliency services in order to handle one or more faltering dependency services based on the faulty metric values associated with the service-parameters. Yet further, the system and the method of the present invention, provides for continuous monitoring of the one or more faltering dependency services, and further withdraws one or more resiliency services once the fault in said dependency services is resolved. Yet further, the system and method of the present invention provides a conversational bot interface for managing the administrative server and associated dependency services.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
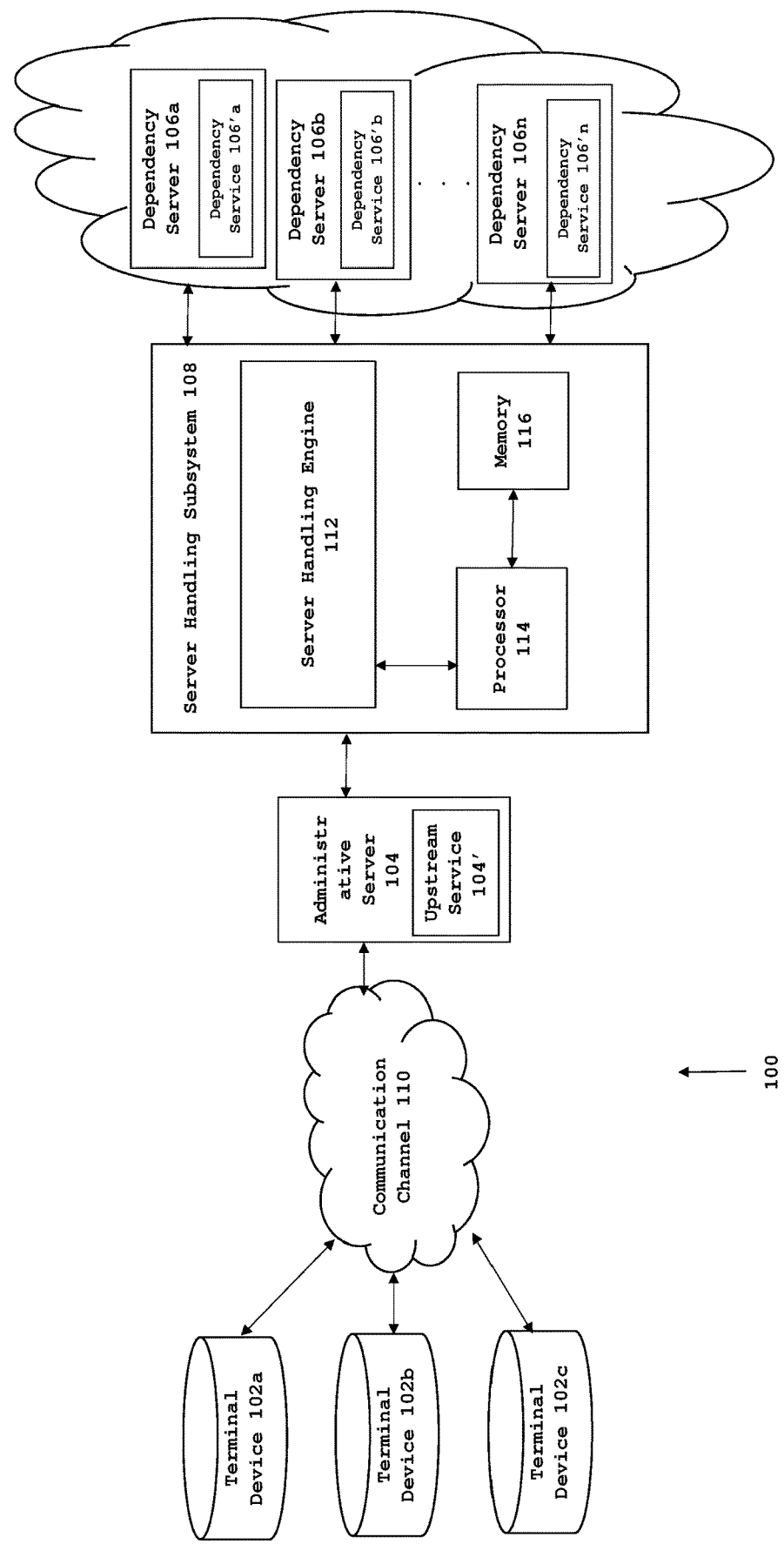
FIG. 1 illustrates a block diagram of a system for handling one or more dependency services hosted by one or more dependency servers for an upstream service hosted by an administrative server in a distributed computer architecture, in accordance with various embodiments of the present invention.

FIG. 1 illustrates a block diagram of a system for handling one or more dependency services hosted by one or more dependency servers for an upstream service hosted by an administrative server in a distributed computer architecture, in accordance with various embodiments of the present invention. Referring to FIG. 1, in an embodiment of the present invention, the system 100 comprises multiple terminal devices 102a, 102b and 102c, an administrative server 104 hosting an upstream service 104', multiple dependency servers 106a, 106b . . . 106n hosting one or more dependency services 106'a, 106'b . . . 106'n, and a service handling subsystem 108.

In various embodiments of the present invention, the terminal devices 102a, 102b, and 102c may include but are not limited to a smart phone, a computer, a tablet, a microcomputer or any other wired or wireless processing device. In an exemplary embodiment of the present invention, as shown in FIG. 1, the terminal devices 102a, 102b, and 102c interface with the administrative server 104 over a communication channel 110. The communication channel 110 may include a physical transmission medium, such as, a wire, or a logical connection over a multiplexed medium, such as, a radio channel in telecommunications and computer networking. The examples of radio channel in telecommunications and computer networking may include a Local Area Network (LAN), a Metropolitan Area Network (MAN), and a Wide Area Network (WAN). In an exemplary embodiment of the present invention, the terminal devices 102a, 102b, and 102c may request the upstream service 104' from the administrative server 104 via a web browser, user interface of the upstream service etc.

In various embodiments of the present invention, the administrative server 104 hosting the upstream service 104' and multiple dependency servers 106a, 106 b . . . 106n hosting one or more dependency services 106'a, 106'b . . . 106'n may include but are not limited to mail servers, print servers, web servers, game servers, and application servers. In an exemplary embodiment of the present invention, the administrative server 104 is configured to host a flight booking service. Further, the dependency servers 106a, 106b, 106c, 106d and 106f may be configured to host a flight time table service, a customer creation service, a customer update service, inventory adjustment service, seat allocation service and fare calculation service respectively. In various embodiments of the present invention each dependency service may have respective logging, service management, health check and endpoints. Further, working of each dependency service is evaluated based on metric values associated with predetermined service-parameters which may include but are not limited to heap utilization, IO utilization, network latency, CPU usage, and semaphore. The term semaphore is representative of total number of concurrent requests that needs to be served to avoid the blocking of input requests.

In an exemplary embodiment of the present invention, as shown in FIG. 1, the service handling subsystem 108 interfaces with the administrative server 104 and multiple dependency servers 106a, 106b, 106c . . . 106n in the distributed computer architecture. The service handling subsystem 108 receives service requests initiated by the terminal devices 102a, 102b, and 102c from the administrative server 104. The service requests are associated with the functionality provided by the upstream service 104'. The service handling subsystem 108 accordingly manages one or more dependency services 106'a, 106'b, . . . 106'n associated with the upstream service 104' to complete the service requests initiated by the terminal devices 102a, 102b, and 102c. It may be understood that the present invention is not limited to the number of terminal devices and the number of dependency servers with which the service handling subsystem 108 interfaces.

The service handling subsystem 108 comprises a service handling engine 112, a processor 114 and a memory 116. The service handling engine 112 is a self-learning engine configured to automatically monitor one or more dependency services, analyze complex statistical data, extract metrics data, identify faltering dependency services based on extracted metrics data, provide conversational bot assistance for managing the administrative server 104, enable resiliency service, select resiliency parameters based on faulty metrics data, and withdraw one or more resiliency services once the fault in said dependency service is resolved. Examples of faulty metric data in the dependency services may include values representing excessive network latency, excessive memory utilization, excessive concurrent requests, and excessive I/O device utilization. The one or more statistics of the dependency services may be stored and maintained in the memory 116 or some external storage (not shown) for future use by the service handling engine 112, which in turn provides speed, precision and superior performance in detection of analyzing dependency servers in future.

In various embodiments of the present invention, the service handling engine 112 is configured to monitor and analyze one or more statistics of one or more dependency services 106'a, 106'b, . . . 106'n associated with the upstream service 104' for identifying any abnormality in the behavior of the dependency services. In particular, the service handling engine 112 constantly monitors health, availability, load and response time of each dependency service 106'a, 106'b . . . 106'n based on metric values associated with predetermined service-parameters of each dependency service. The service handling engine 112 retrieves metric values associated with predetermined service-parameters from the dependency services 106'a, 106'b, . . . 106'n and analyses the retrieved metric values based on a first set of rules. In an exemplary embodiment of the present invention, the first set of rules comprises comparing the retrieved metric values with threshold metric values associated with predetermined service-parameters. The threshold metric values are default predetermined standard values which may be fetched from a database (not shown). Further, the dependency services, where the metric values are greater than the threshold metric values are identified as the faltering dependency services. In another exemplary embodiment of the present invention, the service handling engine 112 provides a conversational bot interface (not shown) to configure the threshold metric values. Further, said conversational bot interface notifies administrative server 104 regarding the status of the dependency services.

The service handling engine 112 further enables resiliency services in order to handle one or more faltering dependency services based on the faulty metric values associated with the service-parameters. For instance if the service handling engine 112 identifies that the fault in the dependency service is due to excessive network latency, said engine automatically sets the parameters of the resiliency service as per the time required for the faltering dependency service to recover from network latency. Likewise if the fault is due to excessive CPU utilization, the service handling unit 112 sets the parameters of the resiliency service accordingly. In an exemplary embodiment of the present invention, the service handling engine 112 provides a conversational bot interface for selecting the parameters of the resiliency service and enabling the resiliency services.

The service handling engine 112 monitors the one or more faltering dependency services for recovery, and further disables one or more resiliency services once the fault in said dependency services is resolved. If the service handling engine 112 evaluates that the faltering dependency service may take longer duration for recovery than a default threshold recovery value, it may select other dependency service providing same functionality as the faltering dependency service based on the metric values associated with the service-parameters.

In various embodiments of the present invention, the service handling engine 112 has multiple units which work in conjunction with each other for handling one or more services 106'a, 106'b, . . . 106'n hosted by one or more dependency servers 106a, 106b, . . . 106n for the upstream service 104' hosted by the administrative server 104 in a distributed computer architecture. The various units of the service handling engine 112 are operated via the processor 114 specifically programmed to execute instructions stored in the memory 116 for executing respective functionalities of the units of service handling subsystem 108 in accordance with various embodiments of the present invention.

In another embodiment of the present invention, the service handling subsystem 108 may be implemented in a cloud computing architecture in which data, applications, services, and other resources are stored and delivered through shared data-centers. In an exemplary embodiment of the present invention, the functionalities of the service handling subsystem 108 are delivered to the administrative server 104 as software as a service (SAAS).

In an exemplary embodiment of the present invention, the service handling subsystem may be implemented as a pluggable adaptor with the administrative server 104 hosting upstream service.

Figure 2:
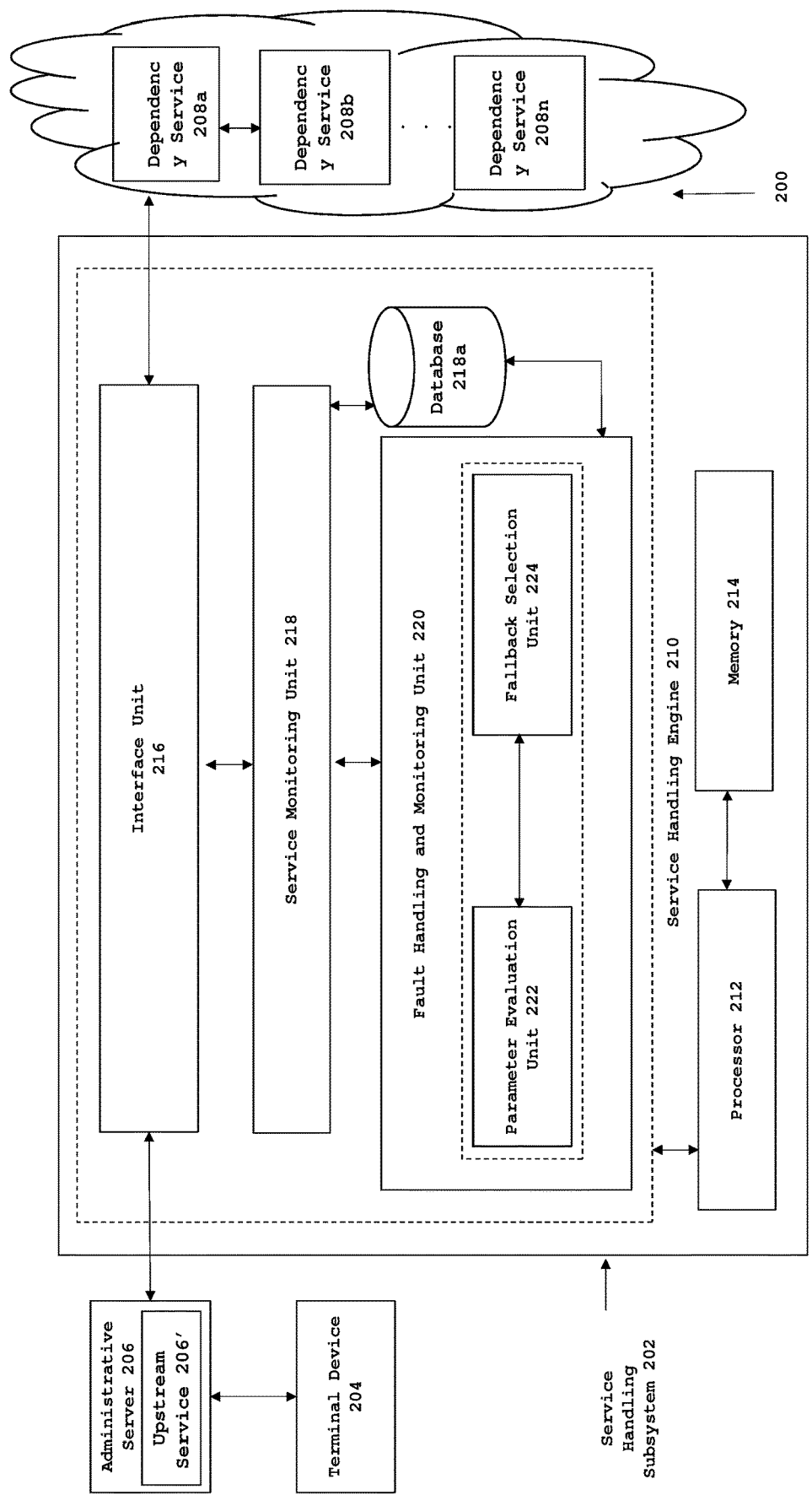
FIG. 2 is a detailed block diagram of a service handling subsystem for handling one or more dependency services hosted by one or more dependency servers for an upstream service hosted by an administrative server in a distributed computer architecture, in accordance with various embodiments of the present invention.

FIG. 2 is a detailed block diagram of a service handling subsystem for handling one or more dependency services hosted by one or more dependency servers for an upstream service hosted by an administrative server in a distributed computer architecture, in accordance with various embodiments of the present invention.

The service handling subsystem 202 interfaces with the terminal device 204 via an administrative server 206 over a communication channel (not shown). Further, the service handling subsystem 202 interacts with the upstream service 206' hosted by the administrative server 206. Yet further, the service handling subsystem 202 interfaces with the multiple dependency services 208a, 208b . . . 208n associated with the upstream service 206' over a second communication channel (not shown). The service handling subsystem 202 comprises a service handling engine 210, a processor 212 and a memory 214.

In an embodiment of the present invention, the service handling engine 210 comprises an interface unit 216, a service monitoring unit 218, and a fault handling and monitoring unit 220.

The interface unit 216 is configured to interact with the upstream service 206' and associated dependency services 208a, 208b . . . 208n. The interface unit 216 receives service requests initiated by the terminal device 204 via the administrative server 206. The service requests may be associated with the functions provided by the upstream service, such as fetching a web page, a web application, email or any other service. The request received via the administrative server 206 are forwarded for completion to one or more dependency services 208a, 208b . . . 208n. The interface unit 216 further transmits a response in relation to said service request to the terminal device 204 via the administrative server 206. In an exemplary embodiment of the present invention, the administrative server 206 accesses and manipulates the service handling engine 210 via the interface unit 216 and the conversational bot interface (not shown).

In an embodiment of the present invention, the service monitoring unit 218 receives the service requests from the interface unit 216. The service monitoring unit 218 is configured to monitor and analyze one or more statistics of dependency services 208a, 208b, . . . 208n hosted by one or more dependency servers (not shown) and accordingly forward the received service request to the desired dependency service. In particular, the service monitoring unit 218 is configured to identify any abnormality in the behavior of the dependency services 208a, 208b, . . . 208n. The service monitoring unit 218 constantly monitors health, availability, load and response time of each of the dependency service 208a, 208b . . . 208n based on metric values associated with predetermined service-parameters of each dependency service. The service monitoring unit 218 retrieves metric values associated with predetermined service-parameters from each of the dependency services 208a, 208b, . . . 208n and analyses said metric values by applying a first set of rules. In an exemplary embodiment of the present invention, the first set of rules comprises comparing the retrieved metric values with predetermined threshold metric values, where the threshold metric values are stored in a database 218a. In an exemplary embodiment of the present invention, the threshold metric values may be configured via the conversational bot interface. In said exemplary embodiment of the present invention, the threshold metric values stored in the database 218a are overridden by the threshold values fed via conversational bot interface. Further, the dependency services, wherein the metric values are greater than the threshold metric values are identified as faltering dependency services. The predetermined service-parameters may include but are not limited to heap utilization, IO utilization, network latency, CPU usage, and semaphore. In an exemplary embodiment of the present invention, the administrative server 206 is configured to host a flight booking service. Further, flight booking service is dependent on other five dependency services, namely, flight time table service, a customer creation and update service, inventory adjustment service, seat allocation service and a fare calculation service. The service monitoring unit 218 is configured to monitor and analyze statistics of said dependency services and identify one or more faltering dependency services. For instance, if network latency arises between seat allocation service and fare calculation service, the request may get queued up in the seat allocation service which may result in consuming more resources in the seat allocation service. The service monitoring unit 218 identifies fare calculation service as a faltering dependency service. Further, if the metric values of the seat allocation service are greater than or equal to the threshold metric values, the seat allocation service may also be identified as a faltering dependency service. The service monitoring unit 218 generates a list of the faltering dependency services. In another example, if the heap utilization of the seat allocation service is determined around 90%, there is a high chance of said service to fail. Therefore, seat allocation service may be identified as a faltering dependency service.

The fault handling and monitoring unit 220 is configured to receive the list of faltering dependency services from the service monitoring unit 218. In an exemplary embodiment of the present invention, the fault handling and monitoring unit 220 enables resiliency services in order to handle one or more faltering dependency services based on the faulty metric values associated with the service-parameters. A resiliency service includes a circuit breaker and a fallback technique. In various embodiments of the present invention, the enablement of resiliency service is associated with the selection of parameters for the circuit breaker and fallback techniques by the fault handling and monitoring unit 220. The parameters of the circuit breaker may include but are not limited to number of requests to be allowed, reset time, threshold value of similar failures etc. In another exemplary embodiment of the present invention, the fault handling and monitoring unit 220 prompts the administrative server 206 via the interface unit 216 to select the parameters of the circuit breaker, select fallback technique and enable the resiliency services.

The fault handling and monitoring unit 220 comprises a parameter evaluation unit 222 and a fallback selection unit 224. The parameter evaluation unit 222 is configured to evaluate the parameters for the circuit breaker based on the faulty metric values associated with service-parameters when invoked by the fault handling and monitoring unit 220. Based on the parameters evaluated by the parameter evaluation unit 222 the circuit breaker trips, if the number of consecutive failures crosses an evaluated threshold value, and for the duration of a timeout period all attempts to invoke the dependency service fail immediately. After the timeout expires the circuit breaker allows a limited number of test requests to pass through. If those requests succeed the circuit breaker resumes normal operation. Otherwise, if there is a failure the timeout period begins again. For instance, if the fault is due to network latency, the parameter evaluation unit 222, evaluates the approximate time to recover from network latency based on the number of queued up requests, incoming requests and response time from the faltering dependency service. Further, the parameter evaluation unit 222 evaluates the parameters of the circuit breaker based on the evaluated time to recover. In another exemplary embodiment of the present invention, the parameter evaluation unit 222 is configured to evaluate the parameters of the circuit breaker based on a fault-circuit breaker knowledgebase stored and maintained in the database 218*a*. The metric values of the service-parameters and the corresponding circuit breaker reset values may be configured via the conversational bot interface as shown in the table below;

| Service-Parameter | Faulty metric Value | Circuit breaker Reset Value |
|---|---|---|
| Network Latency | 1000 ms | 800 ms (if the network latency value drops to 800 ms then the circuit breaker resets) |
| CPU Utilization | 90% | 70% (if the CPU Utilization value drops to 70% then the circuit breaker resets) |
| Memory Utilization of the system | 80% of the total memory configuration of the system. | 60% of the total memory configuration of the system (if the Memory Utilization value drops to 60% then the circuit breaker resets) |
| Heap utilization of the process in the system | 80% | 60%(if the Heap Utilization value drops to 60% then the circuit breaker resets) |
| IO Utilization - Percentage Utilization of Disk | 90% | 70% (if the IO Utilization drops to 70% then the circuit breaker resets) |
| IO Utilization - Total writes per sec | 1000 | 700(if the IO Utilization Total writes per sec drops to 700 then the circuit breaker resets) |
| Total number of concurrent request (Semaphore) | Depends on the application scalability and configuration. E.g for 3 node cluster with 128 GB RAM and 1 TB of HDD, the semaphore value can be 6000 | If the total number of concurrent request turned to 5000, it resets the circuit breaker |
| Response delay (Delay and Period) | More than 2 second per request for the specified period(10 minutes continuously) | If the response delay is less than a sec, then the circuit breaker is reset |

The fallback selection unit 224 is configured to select an appropriate fallback for one or more faltering dependency services when requested by the fault handling and monitoring unit 220. When the circuit breaker is actuated, the fallback selection unit 224 selects a fallback service similar to the faltering dependency service from the database 218*a* based on the metrics values associated with the service-parameters and all the requests from the circuit breaker are immediately passed on to the selected fallback service. For instance from the above example, the fallback selection unit 224 searches the database 218*a* and select appropriate fallback for the seat allocation service and fare calculation service.

In an exemplary embodiment of the present invention, the fault handling and monitoring unit 220 identifies that the fault in the dependency service is due to network latency, said engine automatically evaluates the parameters of the circuit breaker via the parameter evaluation unit 222 based on the time required for the network latency to be resolved. Likewise if the fault is excessive CPU utilization, the fault handling and monitoring unit 220 accordingly sets the parameters of the circuit breaker. For example, if the fault is due to network latency between seat allocation service and fare calculation service, the fault handling and monitoring unit 220 invokes the parameter evaluation unit 222 to set the parameters of the circuit breaker to accept fixed number of concurrent requests. Further, when max load is reached the circuit breaker is actuated to provide the default response (fallback) via the fallback service selected by the fallback selection unit 224.

Further, the fault handling and monitoring unit 220 monitors the one or more faltering dependency services for recovery, and withdraws the one or more resiliency services once the fault in said dependency services is resolved. The fault handling and monitoring unit 220 closes the circuit breaker to withdraw the resiliency service. If the fault handling and monitoring unit 220 evaluates that the faltering dependency service may take longer duration for recovery than a default threshold recovery value, it may select other dependency service providing similar functionality as the as the faltering dependency service. Yet further, if no more dependency service is available to serve the incoming request in case of failure, the fault handling and monitoring unit 220 waits and monitors the faltering dependency service to recover.

FIG. 3 is a flowchart illustrating a method for handling one or more dependency services hosted by one or more dependency servers for an upstream service hosted by an administrative server in a distributed computer architecture in accordance with various embodiments of the present invention.

At step 302, metric values are retrieved to identify any abnormality in one or more dependency services. In an embodiment of the present invention statistics of dependency services 208*a*, 208*b* . . . 208*n* (FIG. 2) hosted by one or more dependency servers (not shown) are monitored and analyzed. In particular, health, availability, load and response time of each of the dependency service 208*a*, 208*b* . . . 208*n* (FIG. 2) is constantly monitored based on metric values associated with predetermined service-parameters to identify any abnormality in the behavior of said dependency services. The metric values associated with predetermined service-parameters of each dependency service 208*a*, 208*b*, . . . 208*n*(FIG. 2) are retrieved and analysed by applying a first set of rules. In an exemplary embodiment of the present invention, the first set of rules comprises comparing the retrieved metric values with predetermined threshold metric values. The dependency services, wherein the metric values are greater than the threshold values are identified as the faltering dependency services. The predetermined service-parameters may include but are not limited to heap utilization, IO utilization, network latency, CPU usage, and semaphore. In an exemplary embodiment of the present invention, the administrative server 206 is configured to host a flight booking service. Further, the flight booking service is dependent on other five dependency services, namely, flight time table service, a customer creation and update service, inventory adjustment service, seat allocation service and a fare calculation service. For instance, if network latency arises between seat allocation service and fare calculation service, the request may get queued up in the seat allocation service which may result in consuming more resources in the seat allocation service. The fare calculation service is identified as a faltering dependency service. Further, if the metric values of the seat allocation service are greater than or equal to the threshold value, the seat allocation service may also be identified as a faltering dependency service.

At step 304, resiliency services for respective faltering dependency services are enabled based on the faulty metric values associated with the service-parameters. In an exemplary embodiment of the present invention, a resiliency service includes a circuit breaker and a fallback technique. The enablement of resiliency service is associated with the selection of parameters for the circuit breaker and fallback techniques. The parameters of the circuit breaker may include but are not limited to number of requests to be allowed, reset time, threshold value of failure etc. The resiliency services are enabled by evaluating the parameters of the circuit breaker and selecting an appropriate fallback for one or more faltering dependency services. Based on the evaluated parameters the circuit breaker trips, if the number of consecutive failures crosses an evaluated threshold value, and for the duration of a timeout period all attempts to invoke the dependency service fail immediately. All the requests from the circuit breaker are immediately passed on to the selected fallback service. After the timeout expires the circuit breaker allows a limited number of test requests to pass through. If those requests succeed the circuit breaker resumes normal operation. Otherwise, if there is a failure the timeout period begins again.

For instance, if the identified fault is due to excessive network latency, the parameters of the resiliency service are evaluated based on the time required for the network latency to be resolved. Likewise if the fault is due to excessive CPU utilization, the parameters of the resiliency service are accordingly evaluated. For example, if the fault is due to network latency between seat allocation service and fare calculation service, the parameters of the circuit breaker are set to accept fixed number of concurrent requests. Further, when max load is reached the circuit breaker is actuated to provide the default response (fallback) via the selected fallback service.

At step 306, a check is performed to determine if one or more faltering dependency service has recovered. In an exemplary embodiment of the present invention, one or more faltering dependency services are monitored for recovery. At step 308 one or more resiliency services are disabled if the fault in said dependency services is resolved by closing the circuit breaker.

At step 310, if it is determined that the faltering dependency service may take longer duration for recovery than a default threshold recovery value, a check is performed to determine other dependency service providing similar functionality as the faltering dependency service (step 312).

At step 314, dependency service providing similar functionality as the faltering dependency service is selected. Further, if no dependency service is available step 306 is repeated.

FIG. 4 illustrates an exemplary computer system in which various embodiments of the present invention may be implemented. The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 302.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for handling one or more dependency services hosted by one or more dependency servers for an upstream service hosted by an administrative server in a distributed computer architecture, performed by a service handling engine interfacing with the dependency servers and the administrative server, the service handling engine executing instructions stored in a memory via a processor, said method comprising:

analyzing, by the service handling engine, metric values associated with one or more predetermined service-parameters of the one or more dependency services based on a first set of rules, wherein the first set of rules comprises comparing the retrieved metric values with threshold metric values associated with the predetermined service-parameters to determine one or more faltering dependency services;

enabling, by the service handling engine, resiliency services based on faulty metric values associated with the predetermined service-parameters of the one or more faltering dependency services, wherein enabling the resiliency services comprises evaluation of parameters for a circuit breaker of each of the resiliency services and selection of a fallback technique for each of the resiliency services based on the faulty metric values associated with the predetermined service-parameters, wherein evaluating the parameters for the circuit breaker comprises evaluating an approximate time to recover from the faulty metric values associated with the predetermined service-parameters based on a number of queued up requests, incoming requests and a response time from the one or more faltering dependency services;

determining, by the service handling engine, if the one or more faltering dependency services have recovered, wherein the one or more faltering dependency services are monitored and time duration for recovery is determined; and disabling, by the service handling engine, the one or more resiliency services if the one or more faltering dependency services have recovered.

2. The method as claimed in claim 1, wherein the predetermined service-parameters include heap utilization, I/O utilization, network latency, CPU usage, and semaphore.

3. The method as claimed in claim 1, wherein the dependency services having the metric values greater than the threshold metric values are identified as the faltering dependency services and the metric values are identified as the faulty metric values.

4. The method as claimed in claim 1, wherein other dependency services providing similar functionality as the faltering dependency services are selected if it is determined that the faltering dependency services takes a longer duration for recovery relative to a default threshold recovery value.

5. A system for handling one or more dependency services hosted by one or more dependency servers for an upstream service hosted by an administrative server in a distributed computer architecture, the system interfacing with the dependency servers and the administrative server, the system comprising:

a memory storing program instructions; a processor configured to execute program instructions stored in the memory; and a service handling engine in communication with the processor and configured to:

analyze metric values associated with one or more predetermined service-parameters of the one or more dependency services based on a first set of rules, wherein the first set of rules comprises comparing the metric values with threshold metric values associated with the predetermined service-parameters to determine one or more faltering dependency services;

enable resiliency services based on faulty metric values associated with the predetermined service-parameters of the one or more faltering dependency services, wherein enabling the resiliency services comprises evaluation of parameters for a circuit breaker of each of the resiliency services and selection of a fallback technique for each of the resiliency services based on the faulty metric values associated with the predetermined service-parameters, wherein evaluating the parameters for the circuit breaker comprises evaluating an approximate time to recover from the faulty metric values associated with the predetermined service-parameters based on a number of queued up requests, incoming requests and a response time from the one or more faltering dependency services;

determine if the one or more faltering dependency services have recovered, wherein the one or more faltering dependency services are monitored for recovery and a time duration for recovery is determined; and disable the one or more resiliency services if the one or more faltering dependency services have recovered.

6. The system as claimed in claim 5, wherein the predetermined service-parameters include heap utilization, I/O utilization, network latency, CPU usage, and semaphore.

7. The system as claimed in claim 5, wherein the dependency services having the metric values greater than the threshold metric values are identified as the faltering dependency services and the metric values are identified as the faulty metric values.

8. The system as claimed in claim 5, wherein the service handling engine comprises a service monitoring unit in communication with the processor, said service monitoring unit configured to:

retrieve the metric values associated with the one or more predetermined service-parameters from each of the dependency services to analyse one or more statistics of dependency services hosted by the one or more dependency servers; and identify any abnormality in the dependency services based on the metric values associated with the one or more predetermined parameters by applying the first set of rules.

9. The system as claimed in claim 5, wherein the service handling engine comprises a fault handling and monitoring unit in communication with the processor, said fault handling and monitoring unit is configured to enable the resiliency services based on the faulty metric values associated with the one or more predetermined service-parameters;

determine if the one or more faltering dependency services have recovered and select other dependency services providing similar functionality as the faltering dependency services, if it is determined that the faltering dependency services takes a longer duration for recovery in relation to a default threshold recovery value.

10. The system as claimed in claim 9, wherein the fault handling and monitoring unit comprises:
a fallback selection unit configured to select the fallback technique for the one or more faltering dependency services, wherein the fallback selection unit selects a fallback service similar to the faltering dependency service from a database based on the metrics values associated with the predetermined service-parameters and one or more requests from the circuit breaker are immediately passed on to the selected fallback service.

11. A computer program product comprising:
a non-transitory computer-readable medium having computer-readable program code stored thereon, the computer-readable program code comprising instructions that, when executed by a processor, cause the processor to:
analyze metric values associated with one or more predetermined service-parameters of one or more dependency services based on a first set of rules, wherein the first set of rules comprises comparing the metric values with threshold metric values associated with the predetermined service-parameters to determine one or more faltering dependency services;
enable resiliency services based on faulty metric values associated with the predetermined service-parameters of the one or more faltering dependency services, wherein enabling the resiliency services comprises evaluation of parameters for a circuit breaker of each of the resiliency services and selection of a fallback technique for each of the resiliency services based on the faulty metric values associated with the predetermined service-parameters, wherein evaluating the parameters for the circuit breaker comprises evaluating an approximate time to recover from the faulty metric values associated with the predetermined service-parameters based on a number of queued up requests, incoming requests and a response time from the one or more faltering dependency services;
determine if the one or more faltering dependency services have recovered, wherein the one or more faltering dependency services are monitored for a recovery and a time duration for the recovery is determined; and
disable the one or more resiliency services if the one or more faltering dependency services have recovered.

* * * * *